United States Patent [19]
Needham et al.

[11] 3,891,597
[45] June 24, 1975

[54] ROTATIONAL MOLDING OF CROSSLINKABLE POLYMERS

[75] Inventors: Donald G. Needham, Ramona; George R. Hill, Bartlesville, both of Okla.

[73] Assignee: Phillips Petroleum Company, Bartlesville, Okla.

[22] Filed: Aug. 2, 1973

[21] Appl. No.: 384,997

Related U.S. Application Data
[63] Continuation of Ser. No. 100,442, Dec. 21, 1970, abandoned.

[52] U.S. Cl..... 260/42.21; 260/42.42; 260/45.95 R; 260/45.95 F; 260/45.9 R; 260/94.9 GA; 260/94.9 GB; 260/94.9 GD; 260/88.2 S
[51] Int. Cl. ... C08f 47/04; C08f 27/00; C08f 27/22
[58] Field of Search............260/94.9 GA, 94.9 GB, 260/45.95 R, 45.9 R, 94.9 GD, 42.42, 45.95 R, 42.21

[56] References Cited
UNITED STATES PATENTS

| | | | |
|---|---|---|---|
| 3,202,648 | 8/1965 | Latourette et al. | 260/94.9 GA |
| 3,334,080 | 8/1967 | Blanchard | 260/94.9 GA |
| 3,546,161 | 12/1970 | Wolheim | 260/45.85 |
| 3,637,571 | 1/1972 | Polovina | 260/42.21 |

FOREIGN PATENTS OR APPLICATIONS

| | | | |
|---|---|---|---|
| 899,796 | 6/1962 | United Kingdom | 260/94.9 GA |

OTHER PUBLICATIONS

Martinovich, R. J., Plastics Technology, Vol. 9, No. 11, Nov., 1963, pp. 45–48.

*Primary Examiner*—William F. Hamrock

[57] ABSTRACT

In the rotational molding of a polymer of ethylene, it has been found that the presence of ultramarine blue and phthalocyanine green colorants tends to decrease the gelling time of the polymer. This is overcome by incorporating into the composition being molded either 2-hydroxy-4-n-octoxybenzophenone or N,N-bis(hydroxyethyl)alkylamine.

7 Claims, No Drawings

ROTATIONAL MOLDING OF CROSSLINKABLE POLYMERS

This application is a continuation of application Ser. No. 100,422, filed Dec. 21, 1970 now abandoned.

This invention relates to rotational molding of crosslinkable polymers.

In one of its more specific aspects, this invention relates to additives incorporable in rotational molding compositions to improve the gel time of the composition.

Rotational molding of crosslinkable polymers is accomplished by introducing into the mold a quantity of particulate thermoplastic polymer, rotating the hot mold to fuse the polymer and then cooling the mold to solidfy the shape formed of the polymer. Polymers of ethylene, including homopolymers and copolymers of ethylene and olefin hydrocarbons having 3 to 8 carbon atoms per molecule, including butene, and mixtures of such polymers are frequently rotational molded. One of the best compositions comprises a polymer of ethylene, that is, an ethylene homopolymer or a copolymer of ethylene and at least one acyclic straight or branched chain mono-1-olefin hydrocarbon having 3 to 8 carbon atoms per molecule, or a mixture thereof.

Into such polymer compositions are frequently incorporated crosslinking materials. Such crosslinking compounds include acetylenic high molecular weight diperoxy compounds selected from various hexynes and octynes, each of which contains a radical selected from the group consisting of tertiary alkyl, alkyl carbonate and benzoate. Representative crosslinking agents include 2,5-dimethyl-2,5-di(t-butylperoxy)hexyne-3 and 2,5-dimethyl-2,5-di(peroxybenzoate) hexyne-3. The inclusion of these and other known crosslinking materials maintain a definite range of the gel time of the polymer, that is, the period during which the polymer retains sufficient plasticity to be shaped and molded before crosslinking. Inasmuch as the process of filling the mold and distributing the polymer uniformly within the mold is time consuming, all polymeric compositions possess a minimum desirable gel time so as to permit such manipulation. In the absence of a sufficient gel time, the molded product exhibits uneven polymer distribution, as evidenced by pin holes, leaks and thin spots.

The polymer composition can also include other materials such as stabilizers, foaming agents, pigments, dyes and colorants. However, it has been found that the presence of certain of these materials, and seemingly the pigments and dyes in particular, accelerate the action of the crosslinking agent to produce premature gelling. Accordingly, it has proved of considerable difficulty to produce rotational molded color articles of uniform quality. This invention solves that problem.

This invention is directed to increasing the gel time of rotational molding polymer compositions which included a crosslinking agent and a colorant by adding to the composition one of 2-hydroxy-4-n-octoxybenzophenone and N,N-bis(hydroxyethyl)alkylamine.

The first of these gel-deterrent compounds, 2-hydroxy-4-n-octoxy-benzophenone, is a solid and is commercially available as "Cyasorb 531" from American Cyanamid Corp., Bound Brook, N. J.

N,N-bis(hydroxyethyl)alkylamine, the second gel-deterrent material, is a solid and is commercially available as "Armostat 310" from Armour Industrial Chemical, Chicago, Ill.

These gel-deterrent materials can be incorporated into the polymeric composition in any suitable manner. Preferably, they are incorporated in amounts up to about 0.05 to about 0.50 weight percent of the composition, and can be employed individually or in combination.

These gel-deterrent materials are incorporated in the polymeric materials to offset the deleterious of the colorant upon the gel time of the polymeric composition, most colorants acting to accelerate the action of the crosslinking agent. Among those colorants which accelerate this action are ultramarine blue and phthalocyanine green. Surprisingly, these geldeterrent materials have no significant effect on the gel time of the polymer composition in the absence of the inclusion therein of a colorant which is deleterious to the gel time of the polymeric composition.

The effectiveness of the gel-deterrent materials of this invention are demonstrated by the following data.

EXAMPLE

A polymeric composition comprising polyethylene and a crosslinking agent was prepared. Its gel time was determined, it being desired that the gel time of the composition upon introduction into the molding process be not less than 15 minutes.

A colorant and the gel-deterrents were then individually and collectively incorporated in the composition and the gel time for each composition was determined. In all instances, the colorant was ultramarine blue. Results were as follows:

| Gel Deterrent, Wt. % | Colorant, Wt. % | Polymeric Composition Gel Time, Min. |
|---|---|---|
| 0 | 0 | 21 |
| Cyasorb 531 (0.5) | 0 | 21 |
| Armostat 310 (0.25) | 0 | 22 |
| 0 | 0.25 | 11 |
| Cyasorb 531 (0.5) | 0.25 | 21 |
| Armostat 310 (0.25) | 0.25 | 23 |
| Cyasorb 531 & Armostat 310 (0.50 Total) | 0.25 | 22 |

The above data indicate that the effectiveness of the gel-deterrent materials in restoring gel time in colored polymer compositions. These data also indicate that their effect in doing so is unexpected inasmuch as, in the absence of a colorant which acts to decrease gel time, these compounds exhibit substantially no gel-deterrent effect. Hence, their presence is critical as to the presence of colorants which act to decrease the gel time of polymeric compositions comprising crosslinking agents.

The inclusion of these gel-deterrent materials is also critical as to the nature of the colorant itself since the following data show that not all of the conventionally employed polymer colorants decrease the gel time of polymeric composition comprising a crosslinking agent and not all colorants of a generic group do so. This is illustrated in the following data in which the effect of certain colorants is demonstrated. The polymer was the crosslinked polymer employed in the previous example.

| Colorant | Wt. % | Polymeric Composition, Gel Time, Min. |
|---|---|---|
| 0 | 0 | 21 |
| Titanium Oxide | 0.25 | 21 |
| Carbon Black, Type M74 | 0.14 | 21 |
| Carbon Black, Type S315 | 0.14 | 12 |
| Carbon Black, Type Spheron 9 | 0.14 | 13 |

The above data illustrate that not all conventional colorants act to decrease the gel time of a crosslinked polymeric compound and that not all members of a generic group act to decrease the gel time of such compositions. Hence, this invention is critical as to the employment of colorants which act to reduce the gel time of crosslinked polymeric compositions.

It will be evident from the foregoing that various modifications can be made to the method of this invention. Such modifications, however, are considered to be within the scope of the invention.

What is claimed is:

1. In the rotational molding of homopolymers and copolymers of ethylene and olefin hydrocarbons having 3 to 8 carbon atoms per molecule, which polymers contain a crosslinking agent selected from the group consisting of 2,5-dimethyl-2,5-di(t-butylperoxy)-hexyne-3 and 2,5-dimethyl-2,5-di(peroxybenzoate)hexyne-3 and a colorant selected from the group consisting of ultramarine blue and phthalocyanine green, the method of increasing the gel time of the polymer composition in the mold which comprises adding to the composition at least one material selected from the group consisting of 2-hydroxy-4-n-octoxybenzophenone and N,N-bis(hydroxy-ethyl) alkylamine, said material being added in an amount in the range of about 0.05 to about 0.5 weight percent of the composition.

2. The method of claim 1 wherein the polymer is polyethylene.

3. The method of claim 2 wherein the crosslinking agent is 2,5-dimethyl-2,5-di(t-butylperoxy)hexyne-3 and said material is 2-hydroxy-4-n-octoxybenzophenone.

4. The method of claim 3 wherein said material comprises about 0.5 weight percent of the composition.

5. The method of claim 3 wherein the colorant is ultramarine blue.

6. The method of claim 2 wherein the colorant is ultramarine blue.

7. The method of claim 6 wherein the colorant comprises about 0.25 weight percent of the composition.

* * * * *